(12) United States Patent
Nam et al.

(10) Patent No.: US 9,167,580 B2
(45) Date of Patent: Oct. 20, 2015

(54) METHOD AND APPARATUS FOR TRANSMISSION OF PHYSICAL CHANNEL IN DWPTS

(71) Applicant: Samsung Electronics Co., LTD, Suwon-si, Gyeonggi-do (KR)

(72) Inventors: Young-Han Nam, Richardson, TX (US); Boon Loong Ng, Richardson, TX (US); Krishna Sayana, San Jose, CA (US)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 223 days.

(21) Appl. No.: 13/842,093

(22) Filed: Mar. 15, 2013

(65) Prior Publication Data
US 2013/0308596 A1 Nov. 21, 2013

Related U.S. Application Data

(60) Provisional application No. 61/649,819, filed on May 21, 2012, provisional application No. 61/647,954, filed on May 16, 2012.

(51) Int. Cl.
*H04W 72/04* (2009.01)
*H04L 5/14* (2006.01)
*H04L 27/26* (2006.01)
*H04L 5/00* (2006.01)

(52) U.S. Cl.
CPC ......... *H04W 72/0446* (2013.01); *H04L 5/0051* (2013.01); *H04L 5/1469* (2013.01); *H04L 27/2613* (2013.01); *H04L 5/0023* (2013.01)

(58) Field of Classification Search
USPC .......................................... 370/330
See application file for complete search history.

(56) References Cited

U.S. PATENT DOCUMENTS

| 8,009,606 B2* | 8/2011 | Seo et al. | 370/319 |
| 8,780,832 B2* | 7/2014 | Hu et al. | 370/329 |
| 2012/0076028 A1* | 3/2012 | Ko et al. | 370/252 |
| 2012/0106478 A1* | 5/2012 | Han et al. | 370/329 |
| 2012/0155414 A1* | 6/2012 | Noh et al. | 370/329 |

* cited by examiner

*Primary Examiner* — Phuongchau Ba Nguyen

(57) ABSTRACT

For use in a wireless network, a method for scheduling a Downlink Pilot Time Slot (DwPTS) subframe is provided. The method comprises expanding Physical Resource Blocks (PRBs) in a subframe prior to a DwPTS subframe to include resource elements (REs) of the DwPTS subframe, a number of OFDM symbols of the DwPTS subframe being less than or equal to a threshold OFDM symbol number. The method further comprises facilitating for a UE to demodulate REs in a DwPTS subframe based on DeModulation Reference Signals (DMRS) transmitted in a downlink subframe prior to the DwPTS subframe.

20 Claims, 14 Drawing Sheets

800

| 1 | 0 | 3 | 6 | 1 | 4 | 7 |
|---|---|---|---|---|---|---|
| 2 | 5 | 4 | 7 | 2 | 5 | 0 |
| 3 | 6 | 1 | 0 | 3 | 6 | 1 |
| 4 | 7 | 2 | 5 | 4 | 7 | 2 |
| 5 | 0 | 3 | 6 | 1 | 0 | 3 |
| 6 | 1 | 4 | 7 | 2 | 5 | 4 |
| 7 | 2 | 5 | 0 | 3 | 6 | 1 |
| 0 | 3 | 6 | 1 | 4 | 7 | 2 |
| 1 | 4 | 7 | 2 | 5 | 0 | 3 |
| 2 | 5 | 0 | 3 | 6 | 1 | 4 |
| 3 | 6 | 1 | 4 | 7 | 2 | 5 |
| 4 | 7 | 2 | 5 | 0 | 3 | 6 |

| 2 | 5 | 0 | 3 | 6 | 1 | 0 |
|---|---|---|---|---|---|---|
| 3 | 6 | 1 | 4 | 7 | 2 | 5 |
| 4 | 7 | 2 | 5 | 0 | 3 | 6 |
| 5 | 0 | 3 | 6 | 1 | 4 | 7 |
| 6 | 1 | 4 | 7 | 2 | 5 | 0 |
| 7 | 2 | 5 | 0 | 3 | 6 | 1 |
| 0 | 3 | 6 | 1 | 4 | 7 | 2 |
| 5 | 4 | 7 | 2 | 5 | 0 | 3 |
| 6 | 1 | 0 | 3 | 6 | 1 | 4 |
| 7 | 2 | 5 | 4 | 7 | 2 | 5 |
| 0 | 3 | 6 | 1 | 0 | 3 | 6 |
| 1 | 4 | 7 | 2 | 5 | 4 | 7 |

FIG. 8

METHOD AND APPARATUS FOR TRANSMISSION OF PHYSICAL CHANNEL IN DWPTS

CROSS-REFERENCE TO RELATED APPLICATION(S) AND CLAIM OF PRIORITY

The present application claims priority to U.S. Provisional Patent Application Ser. No. 61/649,819, filed May 21, 2012, entitled "TRANSMISSION OF PHYSICAL CHANNELS IN DwPTS". The content of the above-identified patent document is incorporated herein by reference.

TECHNICAL FIELD

The present invention relates to a wireless communication system. More particularly, the present invention relates to a method and an apparatus for transmitting and receiving transmission in Downlink Pilot Time Slot (DwPTS) subframes.

BACKGROUND

3GPP Long Term Evolution (LTE) and Long Term Evolution Advanced (LTE-A) systems may operates in a Frequency Division Duplex (FDD) mode or a Time Division Duplex (TDD) mode. In the FDD mode, two different frequencies are used for uplink and downlink transmission, and the base station and user equipment may send and receive data at the same time. In the TDD mode, the same frequency is used for uplink and downlink transmission, and the base station and user equipment cannot send and receive data at the same time. Therefore, in the TDD mode, the LTE system has configurations specifying subframes for either uplink or downlink.

SUMMARY

For use in a wireless network, a method for scheduling a Downlink Pilot Time Slot (DwPTS) subframe is provided. The method comprises expanding Physical Resource Blocks (PRBs) in a subframe prior to a DwPTS subframe to include resource elements (REs) of the DwPTS subframe, a number of OFDM symbols of the DwPTS subframe being less than or equal to a threshold OFDM symbol number. The method further comprises facilitating for a UE to demodulate REs in a DwPTS subframe based on DeModulation Reference Signals (DMRS) transmitted in a downlink subframe prior to the DwPTS subframe.

For use in a wireless network, a method for demodulating a Downlink Pilot Time Slot (DwPTS) subframe is provided. The method comprises receiving transmissions in expanded Physical Resource Blocks (PRBs), each expanded PRB including a DwPTS subframe with a number of OFDM symbols being less than or equal to a threshold OFDM symbol number, and a subframe prior to the DwPTS subframe. The method further comprises demodulating REs in the DwPTS subframe by utilizing the channel estimates from DeModulation Reference Signals (DMRS) transmitted in the prior subframe.

A base station configured to communicate with a User Equipment (UE) is provided. The base station comprises controller configured to expand Physical Resource Blocks (PRBs) in a subframe prior to a DwPTS subframe to include resource elements (REs) of the DwPTS subframe, a number of OFDM symbols of the DwPTS subframe being less than or equal to a threshold OFDM symbol number. The controller is further configured to facilitate for a UE to demodulate REs in a DwPTS subframe based on DeModulation Reference Signals (DMRS) transmitted in a downlink subframe prior to the DwPTS subframe.

A user equipment configured to communicate with a base station is provided. the user equipment comprises a controller configured to receive transmissions in expanded Physical Resource Blocks (PRBs), each expanded PRB including a DwPTS subframe with a number of OFDM symbols being less than or equal to a threshold OFDM symbol number, and a subframe prior to the DwPTS subframe. The controller is further configured to demodulate transmissions in the DwPTS subframe by utilizing the channel estimates from DeModulation Reference Signals (DMRS) transmitted in the prior subframe.

For use in a wireless network, a method for scheduling a Downlink Pilot Time Slot (DwPTS) subframe is provided. The method comprises expanding Physical Resource Blocks (PRBs) in a subframe prior to a DwPTS subframe to include resource elements of the DwPTS subframe, a number of OFDM symbols of the DwPTS subframe being less than or equal to a threshold OFDM symbol number. The method further comprises scheduling one or more transmissions in an expanded PRBs.

For use in a wireless network, a method for demodulating a Downlink Pilot Time Slot (DwPTS) subframe is provided. The method comprises receiving transmissions in expanded Physical Resource Blocks (PRBs), each expanded PRB including a DwPTS subframe with a number of OFDM symbols being less than or equal to a threshold OFDM symbol number, and a subframe prior to the DwPTS subframe. The method comprises demodulating transmissions in the DwPTS subframe by utilizing the channel estimates from DeModulation Reference Signals (DMRS) transmitted in the prior subframe.

For use in a wireless network, a method for scheduling a Downlink Pilot Time Slot (DwPTS) subframe is provided. The method comprises determining a number of resource elements (REs) per enhanced Resource Element Group (eREG) based on a number of available REs in a Physical Resource Block (PRB), wherein the number of available eREGs, $N_{eREGs}^{RB}$ is calculated as $$N_{eREGs}^{RB} = \left\lfloor \frac{N_{REs}^{total}}{N_{REs}^{eREG}} \right\rfloor,$$

and the number of eREGs per PRB is calculated as either $$\left\lfloor \frac{N_{REs}^{total}}{N_{eREGs}^{RB}} \right\rfloor \text{ or }$$

$$\left\lfloor \frac{N_{REs}^{total}}{N_{eREGs}^{RB}} \right\rfloor + 1,$$

where $N_{REs}^{total}$ is a number of total REs per PRB.

A base station configured to communicate with a User Equipment (UE) is provided. The base station comprises a controller configured to generate DeModulation Reference Signals (DMRS) pattern for facilitating channel estimation for the UE, and to map the DeModulation Reference Signals (DMRS) pattern to the DwPTS subframe, a number of OFDM symbols of the DwPTS subframe being less than or equal to a threshold OFDM symbol number.

A User Equipment (UE) configured to communicate with a base station is provided. The UE comprises a receiver configured to receive one or more transmissions in expanded Physical Resource Blocks (PRBs), each expanded PRB including a DwPTS subframe with a number of OFDM symbols being less than or equal to a threshold OFDM symbol number, and a subframe prior to the DwPTS subframe. The UE further comprises a controller configured to demodulate the one or more transmissions in the DwPTS subframe by utilizing the channel estimates from DeModulation Reference Signals (DMRS) transmitted in the prior subframe.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 8 illustrates a puncture mapping method according to embodiments of the present disclosure.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The following documents and standards descriptions are hereby incorporated into the present disclosure as if fully set forth herein: (i) 3GPP TS 36.211 v10.4.0, "Technical Specification Group Radio Access Network; Evolved Universal Terrestrial Radio Access (E-UTRA), Physical channels and modulation" (hereinafter "REF1"); (ii) 3GPP TS 36.212 v10.5.0, "E-UTRA, Multiplexing and Channel coding" (hereinafter "REF2"); (iii) 3GPP TS 36.213 v10.5.0, "E-UTRA, Physical Layer Procedures" (hereinafter "REF3"); and (iv) 3GPP TS 36.214 v10.1.0, "E-UTRA, Physical Layer Measurement" (hereinafter "REF4").

With regard to the following description, it is noted that the LTE terms "node B," "enhanced node B," and "eNodeB" are other terms for "base station" used below. A base station, as described herein, may have a globally unique identifier, known as a base station identifier (BSID). For some embodiments, the BSID may be a MAC ID. Also, a base station can have multiple cells (e.g., one sector can be one cell), each with a physical cell identifier, or a preamble sequence, which may be carried in a synchronization channel. In addition, the LTE term "user equipment" or "UE" is another term for "subscriber station" used below, and a "mobile station" as described herein is interchangeable with a "subscriber station". Further, User Equipment-specific Reference Signals (UE-RS) is provided for demodulation purpose, and is referred to as demodulation reference signals (DMRS).

Figure 1:
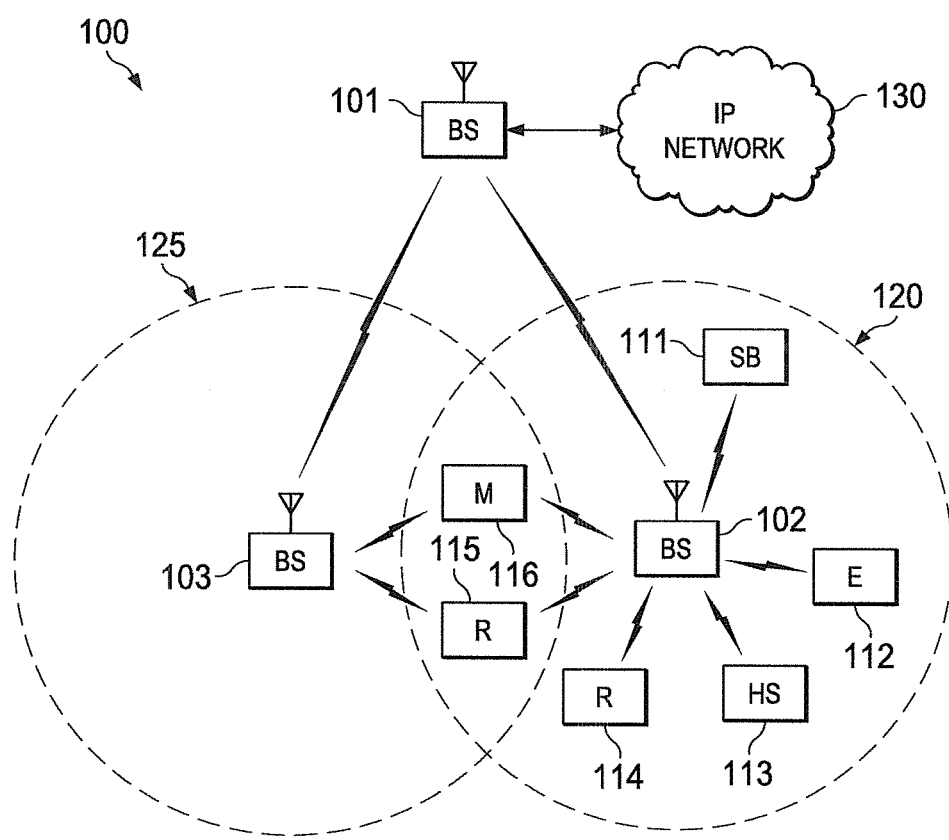
FIG. 1 illustrates a wireless communication network, according to embodiments of the present disclosure.

FIG. 1 illustrates a wireless communication network, according to embodiments of this disclosure. The embodiment of wireless communication network 100 illustrated in FIG. 1 is for illustration only. Other embodiments of the wireless communication network 100 could be used without departing from the scope of this disclosure.

In the illustrated embodiment, the wireless communication network 100 includes base station (BS) 101, base station (BS) 102, base station (BS) 103, and other similar base stations (not shown). Base station 101 is in communication with base station 102 and base station 103. Base station 101 is also in communication with Internet 130 or a similar IP-based system (not shown).

Base station 102 provides wireless broadband access (via base station 101) to Internet 130 to a first plurality of subscriber stations (also referred to herein as mobile stations) within coverage area 120 of base station 102. Throughout this disclosure, the term mobile station (MS) is interchangeable with the term subscriber station. The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access (via base station 101) to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

Each base station 101-103 can have a globally unique base station identifier (BSID). A BSID is often a MAC (media access control) ID. Each base station 101-103 can have multiple cells (e.g., one sector can be one cell), each with a physical cell identifier, or a preamble sequence, which is often carried in the synchronization channel.

While only six subscriber stations are depicted in FIG. 1, it is understood that the wireless communication network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. For example, subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

Figure 2A:
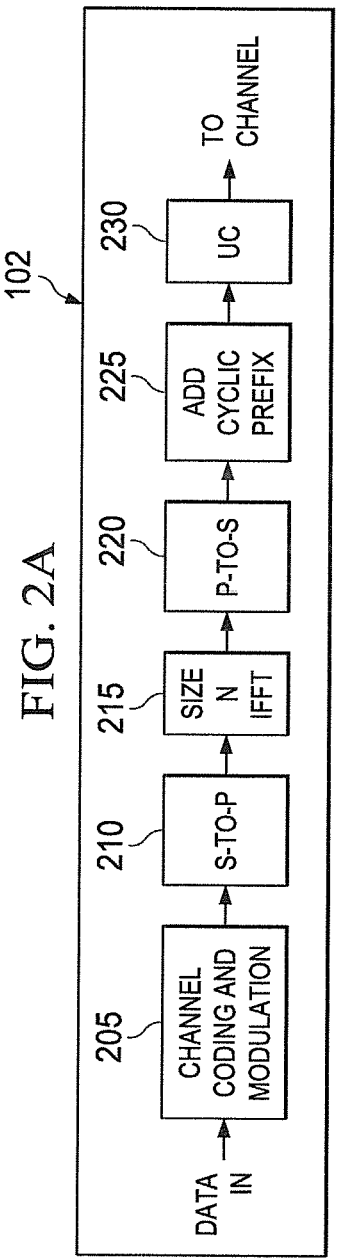
FIG. 2A is a high-level diagram of an orthogonal frequency division multiple access (OFDMA) or millimeter wave transmit path, according to embodiments of the present disclosure.
Figure 2B:
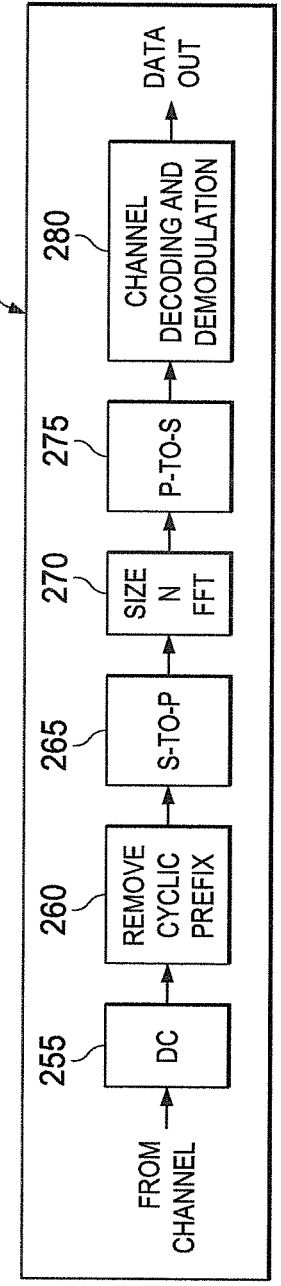
FIG. 2B is a high-level diagram of an OFDMA or millimeter wave receive path, according to embodiments of the present disclosure.

FIG. 2A is a high-level diagram of an orthogonal frequency division multiple access (OFDMA) or millimeter wave transmit path, according to embodiments of this disclosure. FIG. 2B is a high-level diagram of an OFDMA or millimeter wave receive path, according to embodiments of this disclosure. In FIGS. 2A and 2B, the transmit path 200 may be implemented, e.g., in base station (BS) 102 and the receive path 250 may be implemented, e.g., in a subscriber station, such as subscriber station 116 of FIG. 1. It will be understood, however, that the receive path 250 could be implemented in a base station (e.g. base station 102 of FIG. 1) and the transmit path 200 could be implemented in a subscriber station. All or part of the transmit path 200 and the receive path 250 may comprise, or be comprised of, one or more processors.

Transmit path 200 comprises channel coding and modulation block 205, serial-to-parallel (S-to-P) block 210, Size N Inverse Fast Fourier Transform (IFFT) block 215, parallel-to-serial (P-to-S) block 220, add cyclic prefix block 225, up-converter (UC) 230. Receive path 250 comprises down-converter (DC) 255, remove cyclic prefix block 260, serial-to-parallel (S-to-P) block 265, Size N Fast Fourier Transform (FFT) block 270, parallel-to-serial (P-to-S) block 275, channel decoding and demodulation block 280.

At least some of the components in FIGS. 2A and 2B may be implemented in software while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In transmit path 200, channel coding and modulation block 205 receives a set of information bits, applies coding (e.g., LDPC coding) and modulates (e.g., Quadrature Phase Shift Keying (QPSK) or Quadrature Amplitude Modulation (QAM)) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and SS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to RF frequency for transmission via a wireless channel. The signal may also be filtered at baseband before conversion to RF frequency.

The transmitted RF signal arrives at SS 116 after passing through the wireless channel and reverse operations to those at BS 102 are performed. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to subscriber stations 111-116 and may implement a receive path that is analogous to receiving in the uplink from subscriber stations 111-116. Similarly, each one of subscriber stations 111-116 may implement a transmit path corresponding to the architecture for transmitting in the uplink to base stations 101-103 and may implement a receive path corresponding to the architecture for receiving in the downlink from base stations 101-103.

In one embodiment of this disclosure, a base station (BS) can have one or multiple cells, and each cell can have one or multiple antenna arrays, where each array within a cell can have different frame structures, e.g., different uplink and downlink ratios in a time division duplex (TDD) system. Multiple TX/RX (transmitting/receiving) chains can be applied in one array, or in one cell. One or multiple antenna arrays in a cell can have the same downlink control channel (e.g., synchronization channel, physical broadcast channel, and the like) transmission, while the other channels (e.g., data channel) can be transmitted in the frame structure specific to each antenna array.

The base station can use one or more antennas or antenna arrays to carry out beam forming. Antenna arrays can form beams having different widths (e.g., wide beam, narrow beam, etc.). Downlink control channel information, broadcast signals and messages, and broadcast data channels and control channels can be transmitted in wide beams. A wide beam may include a single wide beam transmitted at one time, or a sweep of narrow beams at sequential times. Multicast and unicast data and control signals and messages can be transmitted in narrow beams.

Identifiers of cells can be carried in the synchronization channel. Identifiers of arrays, beams, and the like, can be implicitly or explicitly carried in the downlink control channels (e.g., synchronization channel, physical broadcast channel, and the like). These channels can be sent over wide beams. By acquiring these channels, the mobile station (MS) can detect the identifiers.

A mobile station (MS) can also use one or more antennas or antenna arrays to carry out beam forming. As in BS antenna arrays, antenna arrays at the MS can form beams with different widths (e.g., wide beam, narrow beam, etc.). Broadcast signals and messages, and broadcast data channels and control channels can be transmitted in wide beams. Multicast and unicast data and control signals and messages can be transmitted in narrow beams.

Figure 3:
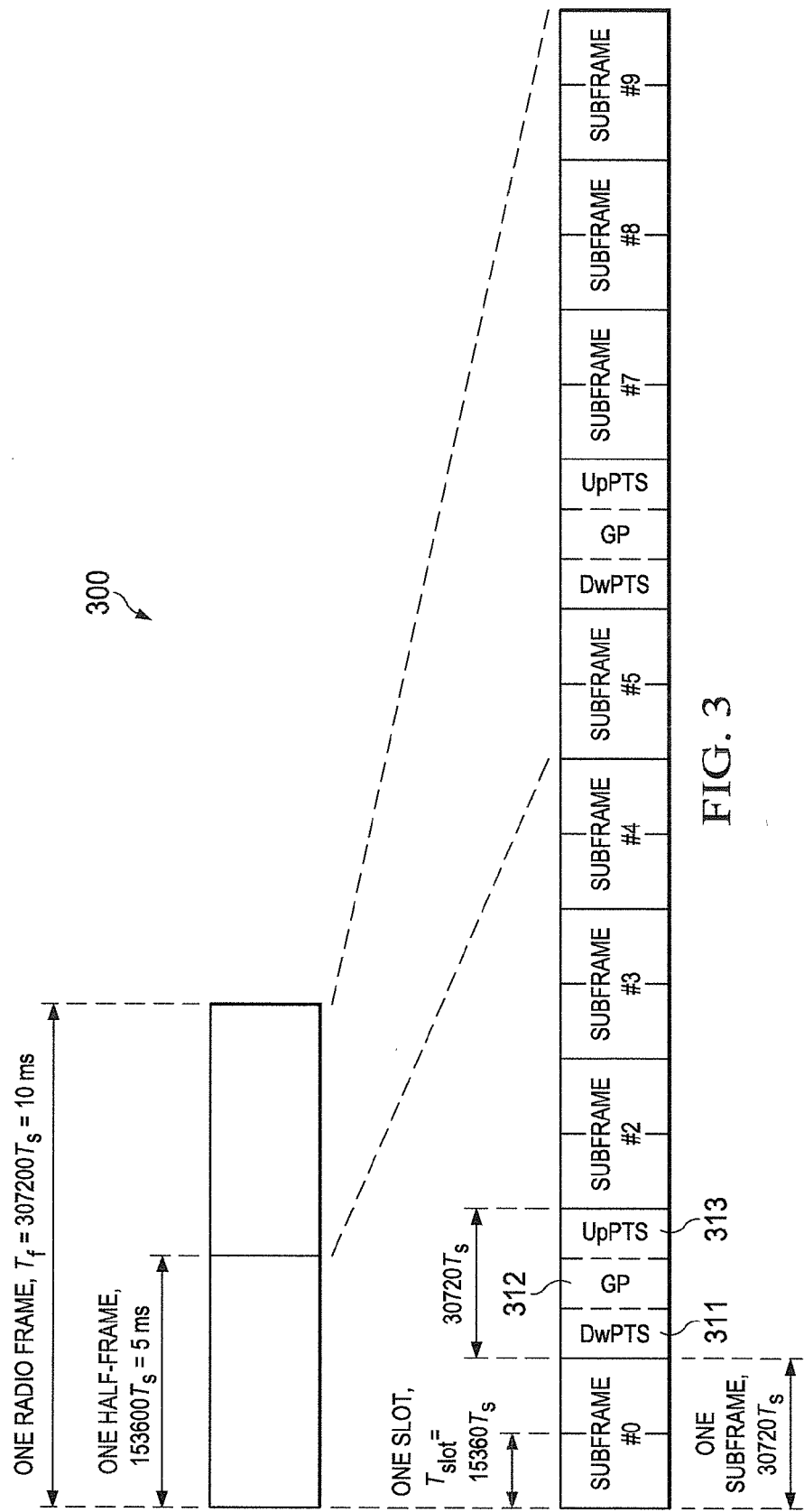
FIG. 3 illustrates a radio frame structure of a time division duplex (TDD) according to the present disclosure.

FIG. 3 shows a radio frame structure 300 of a time division duplex (TDD) as specified in REF 1. The embodiment of the radio frame 300 shown in FIG. 3 is for illustration only. Other embodiments could be used without departing from the scope of this disclosure.

Each radio frame of length $T_f = 307200 \cdot T_s = 10$ millisecond (ms) consists of two half-frames of length $153600 \cdot T_s = 5$ ms each. Each half-frame consists of five subframes of length $30720 \cdot T_s = 1$ ms.

The supported uplink-downlink configurations are listed in TABLE 1 where, for each subframe in a radio frame, "D" denotes the subframe is reserved for downlink transmissions, "U" denotes the subframe is reserved for uplink transmissions and "S" denotes a special subframe with the three fields Downlink Pilot Time Slot (DwPTS) 311, Guard Period (GP) 312 and Uplink Pilot Time Slot (UpPTS) 313.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

As shown in TABLE 1, Uplink-downlink configurations with both 5 ms and 10 ms downlink-to-uplink switch-point periodicity are supported. In case of 5 ms downlink-to-uplink switch-point periodicity, the special subframe exists in both half-frames. In case of 10 ms downlink-to-uplink switch-point periodicity, the special subframe exists in the first half-frame only. Subframes 0 and 5 and DwPTS are always reserved for downlink transmission. UpPTS and the subframe immediately following the special subframe are always reserved for uplink transmission. In case multiple cells are aggregated, the UE can assume the same uplink-downlink configuration across all the cells and that the guard period of the special subframe in the different cells have an overlap of at least $1456 \cdot T_s$.

TABLE 2 shows lengths of the DwPTS, the GP, and the UpPTS according to configurations a structure of the special subframe. The length of DwPTS and UpPTS is given by TABLE 2 subject to the total length of DwPTS, GP and UpPTS being equal to $30720 \cdot T_s = 1$ ms. Each subframe i is defined as two slots, 2i and 2i+1 of length $T_{slot} = 15360 \cdot T_s = 0.5$ ms in each subframe.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal CP | Extended CP | DwPTS | Normal CP | Extended CP |
| 0 | $6592 \cdot T_s$ (3 OFDM symbols) | $2192 \cdot T_s$ | $2560 \cdot T_s$ | $7680 \cdot T_s$ (3 OFDM symbols) | $2192 \cdot T_s$ | $2560 \cdot T_s$ |
| 1 | $19760 \cdot T_s$ (9 OFDM symbols) | | | $20480 \cdot T_s$ (8 OFDM symbols) | | |
| 2 | $21952 \cdot T_s$ (10 OFDM symbols) | | | $23040 \cdot T_s$ (9 OFDM symbols) | | |
| 3 | $24144 \cdot T_s$ (11 OFDM symbols) | | | $25600 \cdot T_s$ (10 OFDM symbols) | | |
| 4 | $26336 \cdot T_s$ (12 OFDM symbols) | | | $7680 \cdot T_s$ (3 OFDM symbols) | $4384 \cdot T_s$ | $5120 \cdot T_s$ |
| 5 | $6592 \cdot T_s$ (3 OFDM symbols) | $4384 \cdot T_s$ | $5120 \cdot T_s$ | $20480 \cdot T_s$ (8 OFDM symbols) | | |
| 6 | $19760 \cdot T_s$ (9 OFDM symbols) | | | $23040 \cdot T_s$ (9 OFDM symbols) | | |
| 7 | $21952 \cdot T_s$ (10 OFDM symbols) | | | — | — | — |
| 8 | $24144 \cdot T_s$ (11 OFDM symbols) | | | — | — | — |

The number of OFDM symbols in DwPTS subframes is determined by the configuration shown in TABLE 2, and the smallest number of OFDM symbols in DwPTS subframes is 3. For the special subframe configurations 0 and 5 with normal CP or configurations 0 and 4 with extended CP, there shall be no PDSCH transmission in DwPTS of the special subframe.

Figure 4:
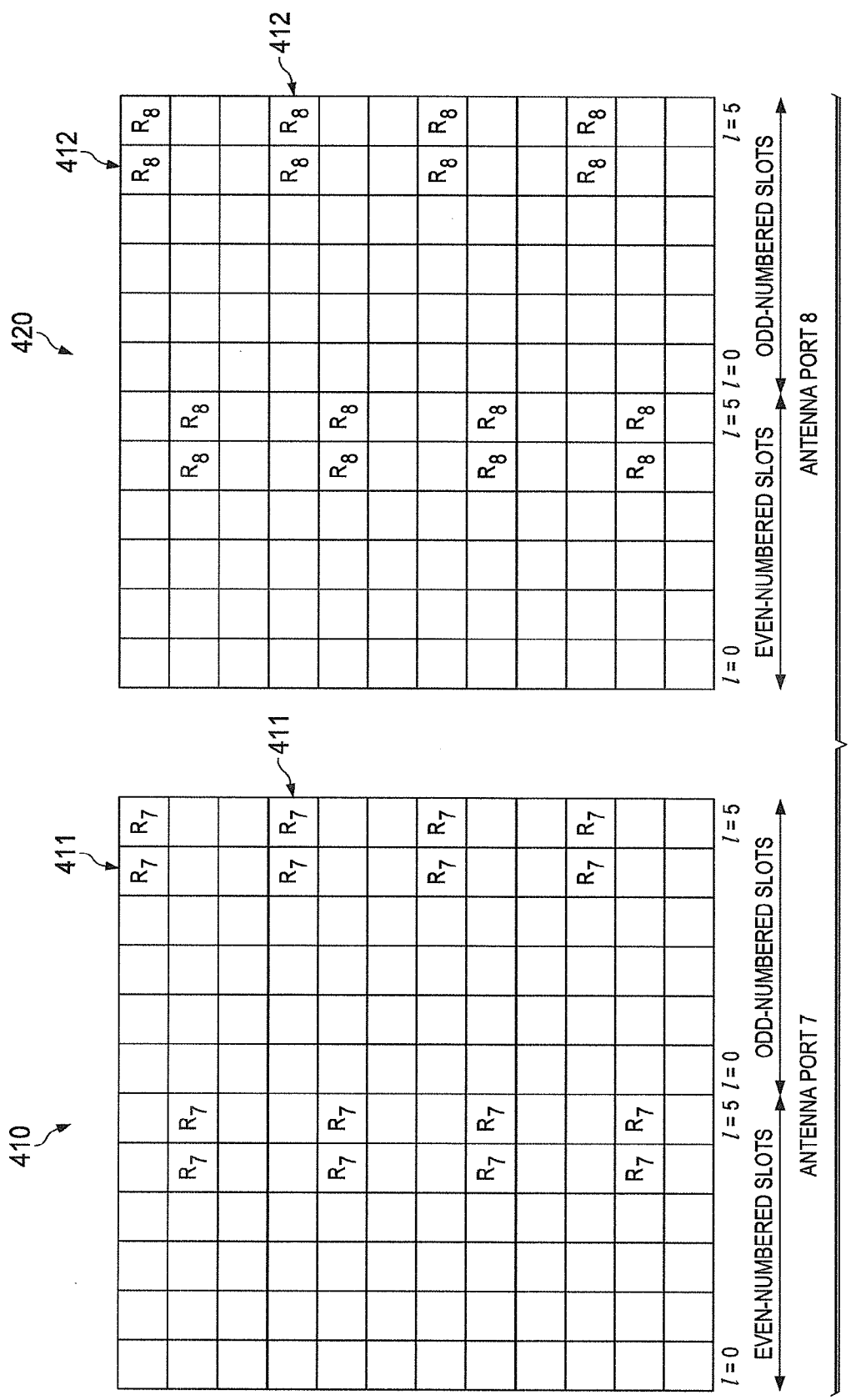
FIG. 4 illustrates a UE-specific RS structure for an extended Cyclic Prefix (CP) for antenna ports (APs) 7 and 8 according to embodiments of the present disclosure.

FIG. 4 illustrates a UE-specific RS structures for an extended Cyclic Prefix (CP) for antenna ports (APs) 7 and 8, respectively according to embodiments of the present disclosure. The embodiments of the UE-Specific RS structures 410, 420 shown in FIG. 4 are for illustration only. Other embodiments could be used without departing from the scope of this disclosure.

A UE-specific RS for two antenna ports $R_7$ 411 and $R_8$ 412 is transmitted in a subframe having an extended CP structure. The UE-specific Reference Signals (UE-RSs) port R7 411 are transmitted on the REs corresponding to the 2nd, 5th, 8th, and 11th subcarriers and the 5th and 6th OFDM symbols, and the REs corresponding to 1st, 4th, 7th, and 10th subcarriers and the 11th and 12th OFDM symbols.

Similarly, UE-RS port $R_8$ 412 are transmitted on resource elements corresponding to 2nd, 5th, 8th, and 11th subcarriers of 5th and 6th OFDM symbols and the REs corresponding to 1st, 4th, 7th, and 10th subcarriers and the 11th and 12th OFDM symbols. The UE-RS ports 7 and 8 can be transmitted by being mapped to the same REs. In this case, RS sequences for each AP can be transmitted by being multiplied by different orthogonal sequences. Examples of the orthogonal sequence may include a Walsh code and a CAZAC.

Referring back to TABLE 2, the number of OFDM symbols in DwPTS subframes is determined by the special subframe configurations, and the smallest number of OFDM symbols in DwPTS subframes is 3 in configurations 0, 5 for a normal CP and in configurations 0, 4 for an extended CP. The small number of available OFDM symbols in DwPTS poises challenges to transmit downlink physical signals. For example, the Rel-10 LTE system does not define UE-RS mapping for special subframe configurations 0 and 5 for a normal CP where the number of OFDM symbols in the DwPTS subframes is 3. Consequently, the Rel-10 LTE system does not support PDSCH transmissions with UE-RS antenna ports 7-14 in the DwPTS subframes when the special subframe configuration is 0 or 5 for a normal CP. In addition, the Rel-10 LTE system does not transmit enhanced Physical Downlink Control Channel (ePDCCH) in these subframes, since no UE-RS ports 7-14 have been defined in the DwPTS of subframe configurations 0 or 5.

In certain embodiments, to be compatible with the Rel-10 LTE system, the new carrier type (NCT) determines whether or not to support ePDCCH in a DL subframe based on whether it is a non-DwPTS subframe or a DwPTS subframe, and the number of available OFDM symbols in the subframe.

In one example, ePDCCH is not transmitted or cannot be configured in DwPTS subframes whose number of OFDM symbols is less than or equal to $N_{symb}$, e.g., where $N_{symb}$=3. In another example, the transmission of ePDCCH can be configured only in non-DwPTS and DwPTS whose number of OFDM symbols is greater than $N_{symb}$. In other words, for the special subframe configurations 0 and 5 with normal CP, or special subframe configurations 0 and 4 with extended CP, there shall be ePDCCH transmission in DwPTS of the special subframe. Meanwhile, in those subframes in which ePDCCH cannot be configured, a CRS-based PDCCH can still be transmitted.

When the number OFDM symbols in the DwPTS subframes is 3, such as in special subframe configurations 0 and 5 for normal CP, or special subframe configurations 0 and 4 for extended CP, no UE-RS pattern is defined and no CRS is transmitted in the DwPTS in the LTE system, which raises the issue of configuring 3-OFDM-symbol DwPTS.

In certain embodiments, the new carrier type is configured not to select the existing special subframe configurations 0 and 5 with normal CP or the existing special subframe configurations 0 and 4 with extended CP, while the Rel-10 compatible carriers are configured to select the same special subframe configurations. To do this, a Radio Resource Control (RRC) can configure the special subframe configuration not to include those states corresponding to the special subframe configurations 0 and 5 with normal CP, or to the special subframe configurations 0 and 4 with extended CP. Alternatively, the UE can treat RRC signaling of the existing special subframe configurations 0 and 5 with normal CP or the existing special subframe configurations 0 and 4 with extended CP, as erroneous network configuration.

In certain embodiments, to support the new carrier type, the configurations for special subframe are designed, such that the length of 3-OFDM-symbol DwPTS is reduced from 3 OFDM symbols to 0 OFDM symbol.

TABLE 3 shows the special subframe configurations specifying lengths of DwPTS/GP/UpPTS for new carrier type. As shown in the TABLE 3, the length of DwPTS is reduced from 3 OFDM symbols to 0 OFDM symbol in the special subframe configurations 0 and 5 in a normal CP, and the special subframe configurations 0 and 4 for extend CP. In other words, only GP and UpPTS are supported in these subframe configurations.

TABLE 3

| Special subframe configuration | Normal cyclic prefix in downlink | | | Extended cyclic prefix in downlink | | |
|---|---|---|---|---|---|---|
| | DwPTS | UpPTS Normal CP | UpPTS Extended CP | DwPTS | UpPTS Normal CP | UpPTS Extended CP |
| 0 | $0 \cdot T_s$ (0 OFDM symbols) | $2192 \cdot T_s$ | $2560 \cdot T_s$ | $0 \cdot T_s$ (0 OFDM symbols) | $2192 \cdot T_s$ | $2560 \cdot T_s$ |
| 1 | $19760 \cdot T_s$ (9 OFDM symbols) | | | $20480 \cdot T_s$ (8 OFDM symbols) | | |
| 2 | $21952 \cdot T_s$ (10 OFDM symbols) | | | $23040 \cdot T_s$ (9 OFDM symbols) | | |
| 3 | $24144 \cdot T_s$ (11 OFDM symbols) | | | $25600 \cdot T_s$ (10 OFDM symbols) | | |
| 4 | $26336 \cdot T_s$ (12 OFDM symbols) | | | $0 \cdot T_s$ (3 OFDM symbols) | $4384 \cdot T_s$ | $5120 \cdot T_s$ |

TABLE 3-continued

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal CP | Extended CP | DwPTS | Normal CP | Extended CP |
| 5 | $0 \cdot T_s$ (0 OFDM symbols) | $4384 \cdot T_s$ | $5120 \cdot T_s$ | $20480 \cdot T_s$ (8 OFDM symbols) | | |
| 6 | $19760 \cdot T_s$ (9 OFDM symbols) | | | $23040 \cdot T_s$ (9 OFDM symbols) | | |
| 7 | $21952 \cdot T_s$ (10 OFDM symbols) | | | — | — | — |
| 8 | $24144 \cdot T_s$ (11 OFDM symbols) | | | — | — | — |

In certain embodiments, the special subframe configurations 0 and 5 with normal CP or configurations 0 and 4 with extended CP of TABLE 3 are modified such that the length of DwPTS is reduced from 3 OFDM symbols to 1 OFDM symbol or 2 OFDM symbols.

In certain embodiments, no Physical Downlink Share Channel (PDSCH)/ePDCCH is transmitted in the 3-OFDM-symbol DwPTS for the new carrier type. In the embodiment, there shall be no PDSCH/ePDCCH transmission in DwPTS subframes in the existing special subframe configurations 0 and 5 with normal CP, or existing special subframe configurations 0 and 4 with extended CP.

In certain embodiments, the UE-RS is mapped to the 3-OFDM-symbol DwPTS. For example, the UE-RS port 7 or 8 can be scheduled to support the transmission via AP 7 or 8 in the DwPTS. Furthermore, in one such embodiment, other UE-RSs than UE-RS APs 7 and 8 in the DwPTS are not supported in the 3-OFDM-symbol DwPTS. In certain embodiments, either PDSCH transmitted with UE-RS port 7 and/or 8, or ePDCCH is transmitted in the DwPTS with 3 OFDM symbols.

In certain embodiments, the UE-RS is mapped to the resource elements (REs) corresponding to two consecutive OFDM symbols and 3 or 4 subcarriers for 3-OFDM-symbol the DwPTS. For example, the two consecutive OFDM symbols can be either the first and the second OFDM symbols, or the second and the third OFDM symbols.

In another example where a Primary Synchronization Signal (PSS) occupies one OFDM symbol out of the 3 OFDM symbols of the DwPTS subframe, the two OFDM symbols for the UE-RS will be different from the OFDM symbol for the PSS.

In still yet another embodiment, both a PSS and a Secondary Synchronization Signal (SSS) occupy two OFDM symbols in the center 6 PRBs of the DwPTS subframe, the center 6 PRBs cannot be configured to be used for PDSCH or ePDCCH transmissions, while the other PRBs can be configured to be used for PDSCH or ePDCCH transmissions.

Figure 5A:
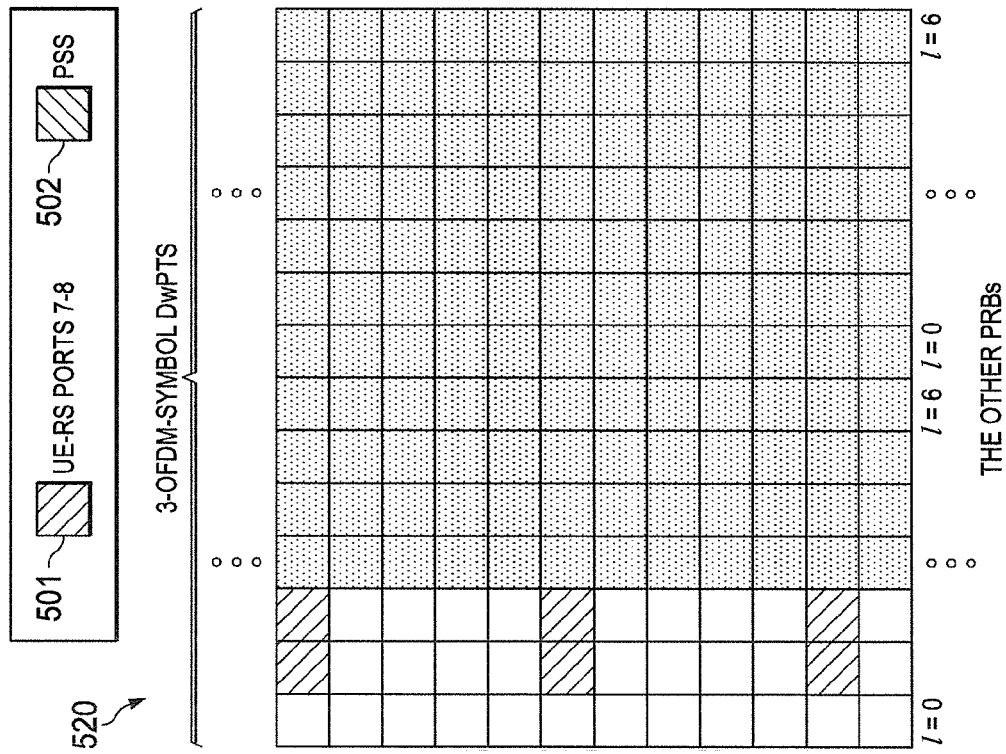
FIGS. 5A through 5D illustrate the exemplary UE-RS mappings in the 3-OFDM-symbol DwPTS subframes according to embodiments of the present disclosure.
Figure 5B:
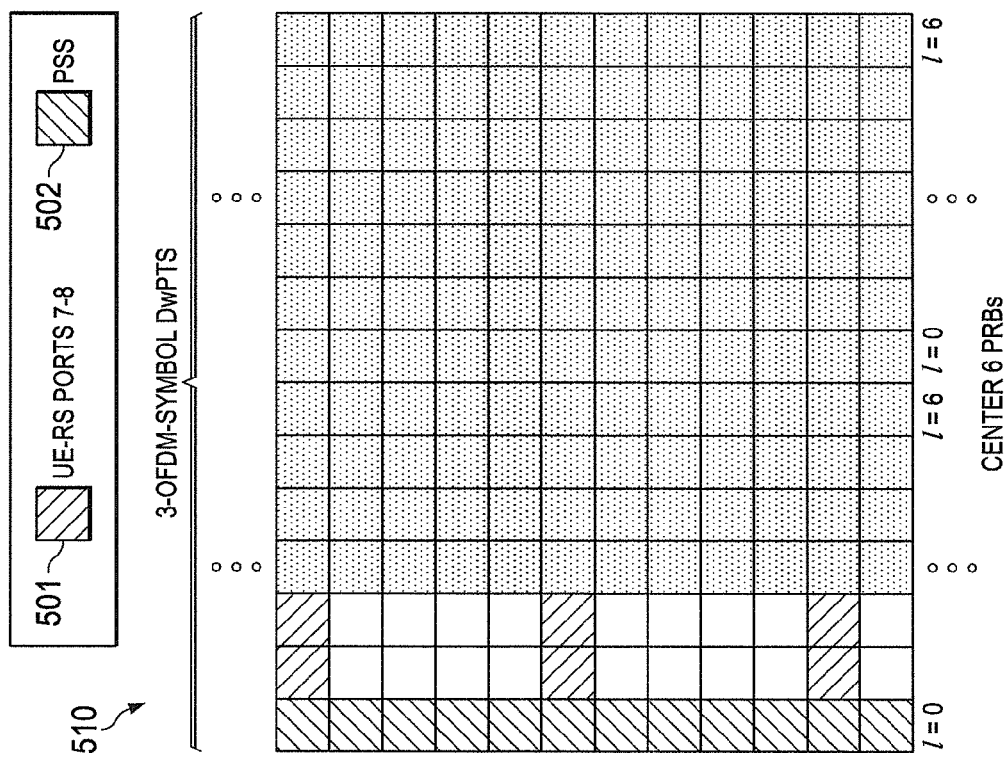
Figure 5D:
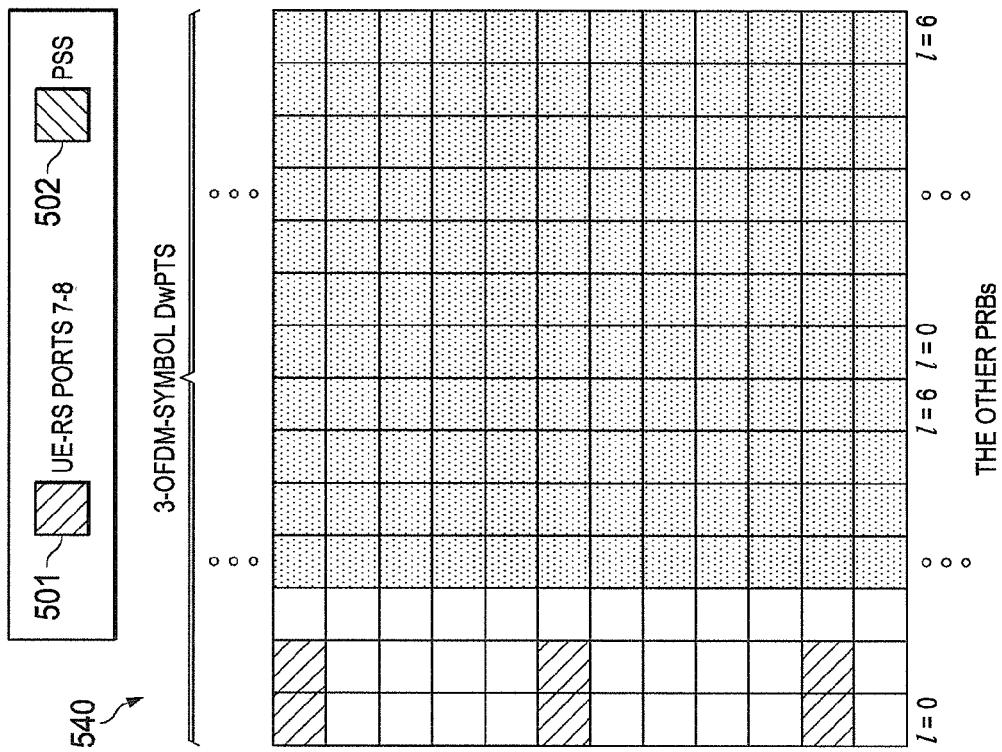

FIGS. 5A through 5D illustrate the exemplary UE-RS mappings in the 3-OFDM-symbol DwPTS subframes according to embodiments of the present disclosure. FIGS. 5A and 5B apply to a normal CP and FIGS. 5C and 5D apply to an extended CP. The embodiments of the UE-RS mapping shown in FIGS. 5A through 5D are for illustration only. Other embodiments could be used without departing from the scope of this disclosure.

In the example shown in FIG. 5A, in the center 6 PRBs 510 of the downlink BW, a PSS 502 is located in the 1st OFDM symbol and UE-RS 501 are mapped to the REs corresponding to the 2nd and 3rd OFDM symbols and the 1st, 5th and 10th subcarriers in 3-OFDM-symbol the DwPTS for a normal CP. In the other PRBs 520 of the 3-OFDM-symbol DwPTS for a normal CP, UE-RS 501 are mapped to the REs corresponding to the 2nd and 3rd OFDM symbols and the 1st, 5th and 10th subcarriers without a PSS 501 being mapped, as illustrated in the example shown in FIG. 5B.

Figure 5C:
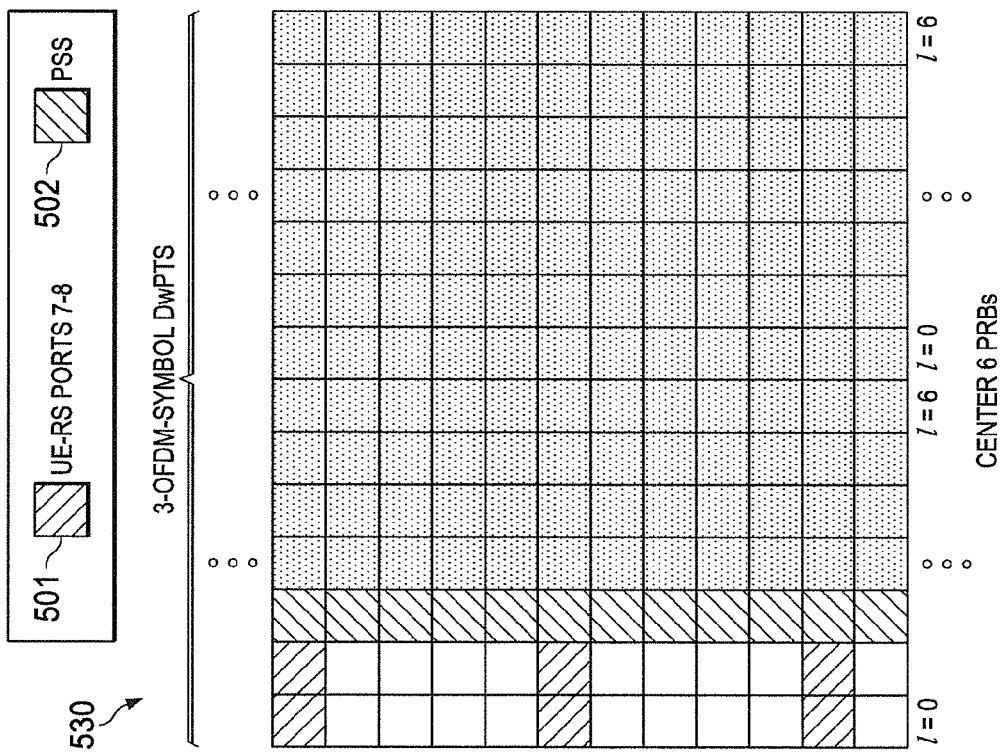

As shown in the example shown in FIG. 5C, in the center 6 PRBs 530 of the downlink BW, a PSS 502 is located in the 3rd OFDM symbol and UE-RSs are mapped to the REs corresponding to the 1st and 2nd OFDM symbols, and the 1st, 5th and 10th subcarriers in the 3-OFDM-symbol DwPTS for the extended CP. In the other PRBs 540 of the 3-OFDM-symbol DwPTS for an extended CP, UE-RS 501 are mapped to the REs corresponding to the 1st and 2nd OFDM symbols and the 1st, 5th and 10th subcarriers without a PSS 502 being mapped, as illustrated in the example shown in FIG. 5D.

Figure 6B:
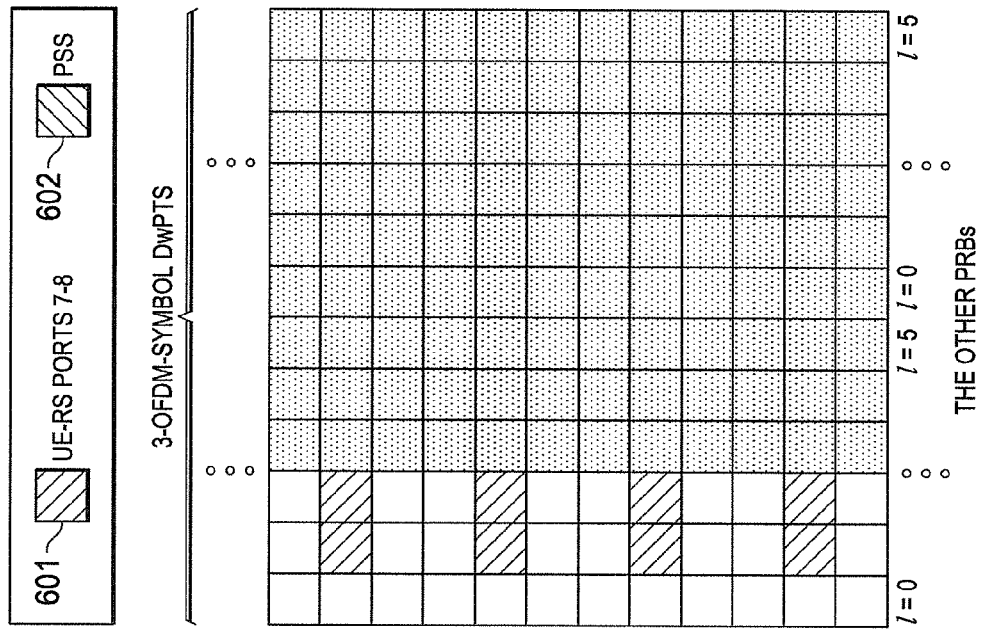
FIGS. 6A through 6D illustrate the exemplary UE-RS mappings in the 3-OFDM-symbol DwPTS subframes according to embodiments of the present disclosure.
Figure 6A:
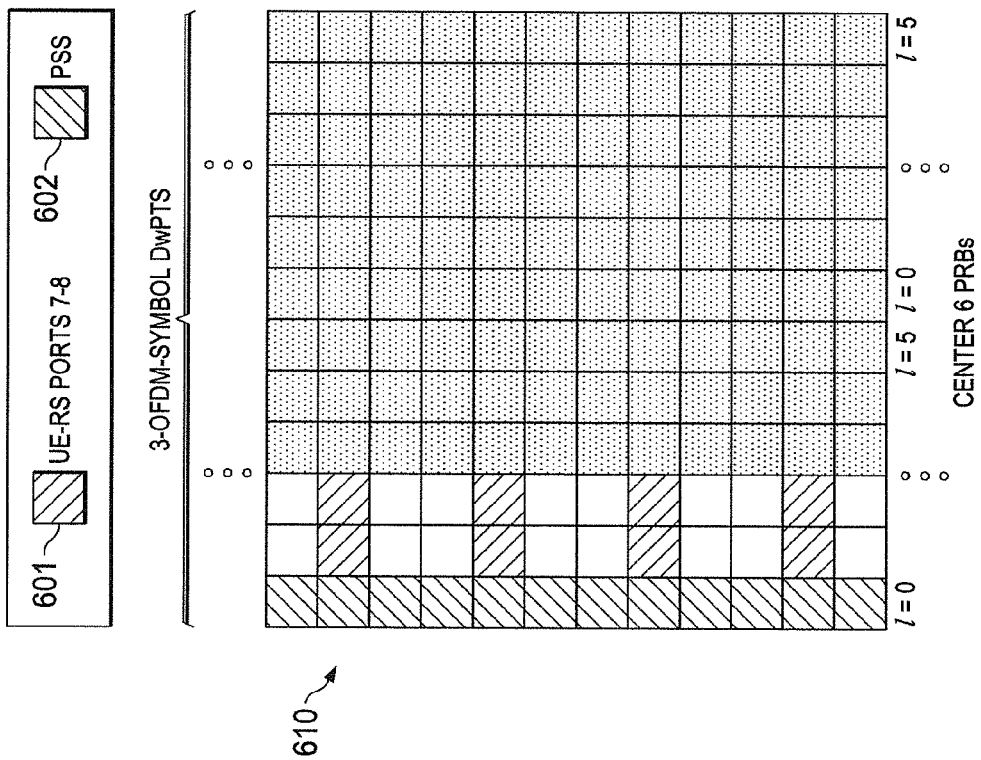
Figure 6D:
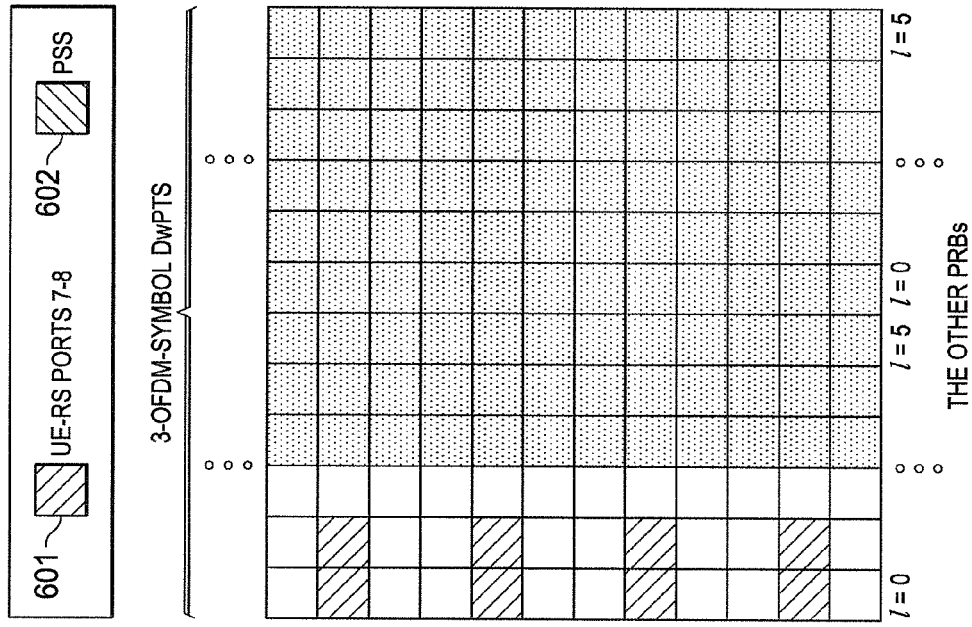

FIGS. 6A through 6D illustrate UE-RS mappings in the 3-OFDM-symbol DwPTS subframes according to embodiments of the present disclosure. FIGS. 6A and 6B apply to a normal CP and FIGS. 6C and 6D apply to an extended CP. The embodiments of the UE-RS mapping shown in FIGS. 6A through 6D are for illustration only. Other embodiments could be used without departing from the scope of this disclosure.

In the example shown in FIG. 6A, in the center 6 PRBs 610 of the downlink BW, the PSS 602 is located in the 1st OFDM symbol and UE-RSs 601 are mapped to the REs corresponding to the 2nd and 3rd OFDM symbols and the 2nd, 4th, 6th and 8th subcarriers in 3-OFDM-symbol DwPTS for a normal CP. In the other PRBs 620 of 3-OFDM-symbol the DwPTS for a normal CP, UE-RSs are mapped to the REs corresponding to the 2nd and 3rd OFDM symbols and the 2nd, 4th, 6th and 8th subcarriers in the 3-OFDM-symbol DwPTS without a PSS being mapped.

Figure 6C:
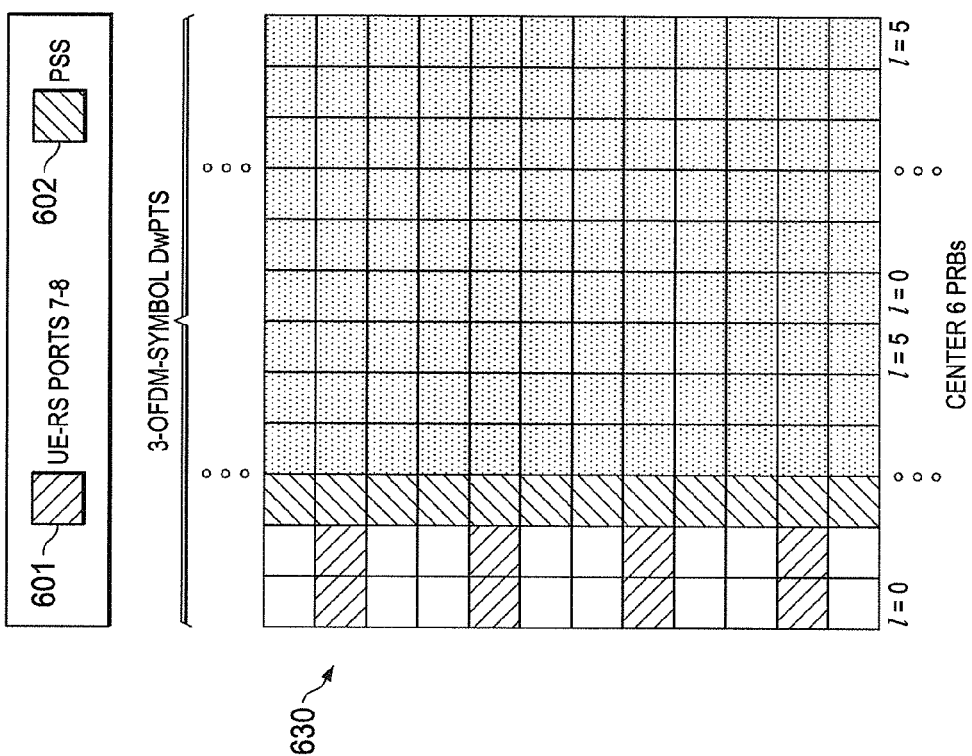

In the example shown in FIG. 6C, in the center 6 PRBs 630 of the downlink BW, the PSS 602 is located in the 3rd OFDM symbol and UE-RSs are mapped to the REs corresponding to the 1st and 2nd OFDM symbols and the 2nd, 4th, 6th and 10th subcarriers for the 3-OFDM-symbol the DwPTS. In the other PRBs 640 of the 3-OFDM-symbol DwPTS for an extended CP, UE-RSs 601 are mapped to the REs corresponding to the 1st and 2nd OFDM symbols and the 2nd, 4th, 6th and 10th subcarriers without a PSS being mapped, as illustrated in the example shown in FIG. 6D.

In addition, the number of enhanced Resource Element Groups (eREGs) transmitted in each PRB can be limited. For example, each of the center 6 PRBs in which PSS/SSS is mapped, only one eREG can be mapped, while two eREGs can be mapped in each of the other PRBs. In case two eREGs are mapped, the two eREG's DM-RSs can be APs 7 and port 8, respectively. In certain embodiments, the 3-OFDM-symbol DwPTS subframes are utilized only for ePDCCH transmissions, and they cannot be utilized for PDSCH transmissions.

In certain embodiments, if the special subframe configuration is supported on NCT with one symbol assigned to DwPTS, then PSS occupies this symbol in the center 6 PRBs of a downlink BW. In certain embodiments, if the special subframe configuration is supported on NCT with two symbols assigned to DWPTS, then PSS and SSS occupy these symbols in the center 6 PRBs.

In certain embodiments, each PRB conveying transmissions such as PDSCH and/or ePDCCH in a subframe prior in time to the 3-OFDM-symbol DwPTS is expanded to include REs of the 3-OFDM-symbol DwPTS. For example, in a normal CP, each PRB in subframes 0 and 5 is expanded to include the REs of the subframes 1 and 6 with 3-OFDM-symbol DwPTS. Also, in an extended CP, each PRB in subframes 0 and 4 is expanded to include the REs of the subframes 1 and 5 with 3-OFDM-symbol DwPTS.

In addition, the UE-RS transmitted in the subframe can be used for demodulating signals transmitted in the 3-OFDM-symbol DwPTS. In other words, the transmissions scheduled 3-OFDM-symbol DwPTS can be demodulated by utilizing the channel estimates from the UE-RS transmitted in subframe 0 or 5 in the same extended PRBs. In this case, the UE can assume that a same precoding has been applied for the UE-RS across the two subframes.

In certain embodiments, a base station comprises a controller configured to expand Physical Resource Blocks (PRBs) in a subframe prior to a DwPTS subframe to include resource elements (REs) of the DwPTS subframe, a number of OFDM symbols of the DwPTS subframe being less than or equal to a threshold OFDM symbol number, and to facilitate for a UE to demodulate REs in a DwPTS subframe based on User Equipment-specific Reference Signals (UE-RSs) transmitted in a downlink subframe prior to the DwPTS subframe by applying the same precoding scheme for the UE-RS across the two subframes.

Figure 7A:
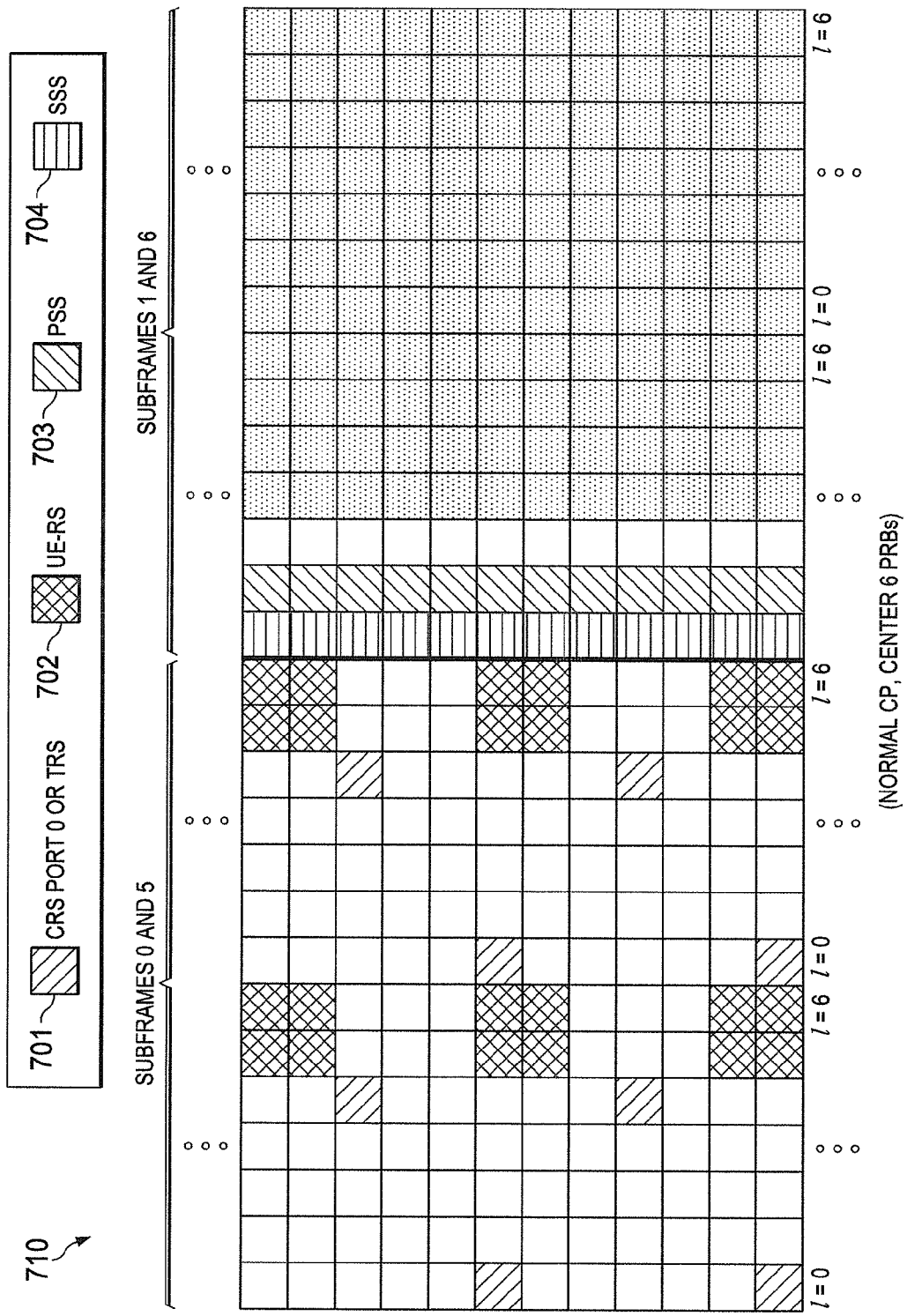
FIGS. 7A through 7D illustrate the expanded PRBs and associated with the 3-OFDM-symbol DwPTS subframes according to embodiments of the present disclosure.
Figure 7B:
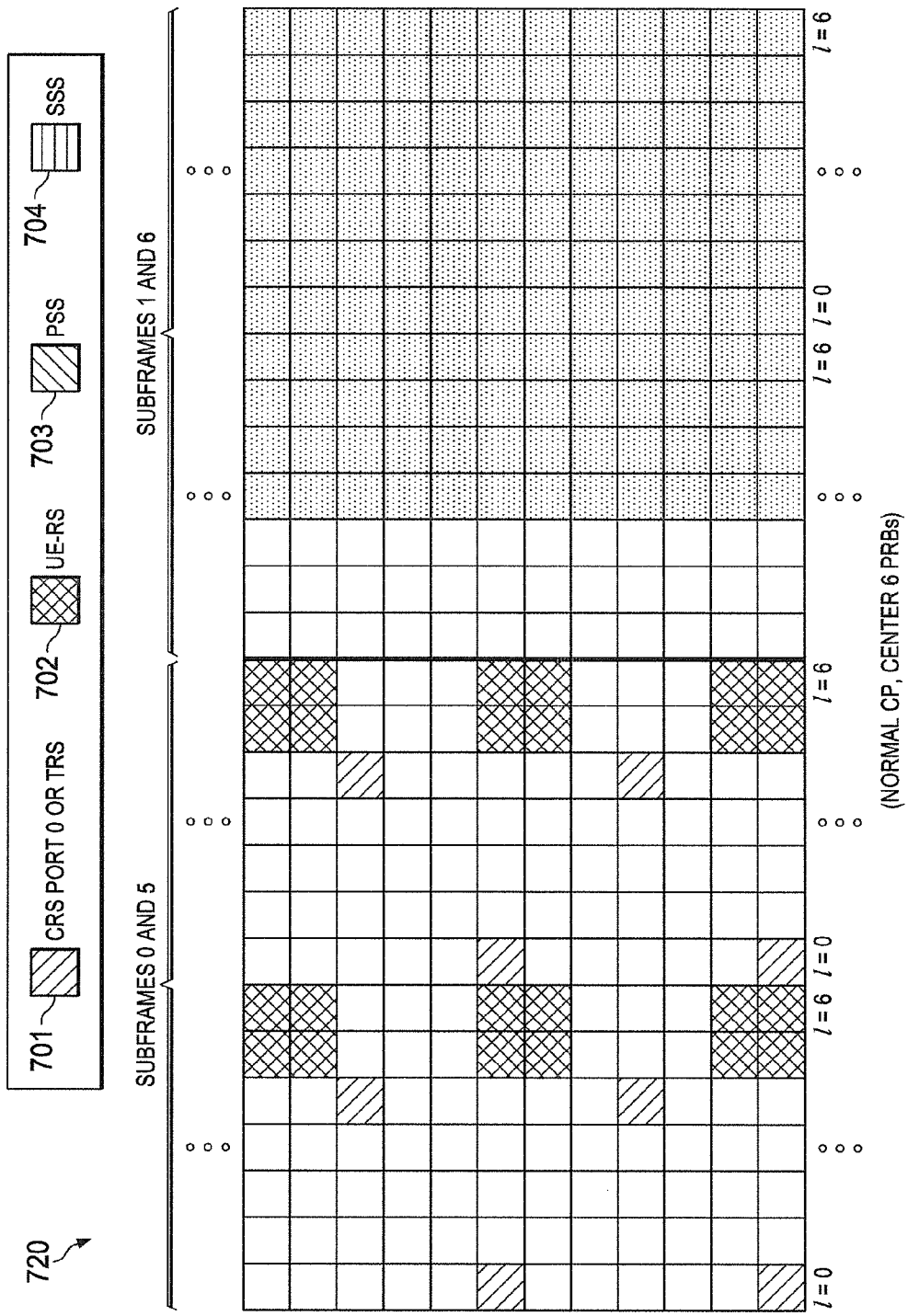

FIGS. 7A through 7D illustrate the expanded PRBs associated with the 3-OFDM-symbol DwPTS subframes according to embodiments of the present disclosure. FIGS. 7A and 7B apply to a normal CP and FIGS. 7C and 7D apply to an extended CP. The embodiments of expanded PRBs are for illustration only. Other embodiments could be used without departing from the scope of this disclosure.

In the example shown in FIG. 7A, in the center 6 PRBs 710 of normal CP, the OFDM symbols 0 and 1 of the 3-OFDM-symbol DwPTS are used for PSS and SSS transmissions. Thus, the extended PRBs consist of 14 OFDM symbols of the subframes 1 or 6, and 1 OFDM symbol of DwPTS, a total of 15 OFDM symbols for scheduling PDSCH/ePDCCH.

In the other PRBs 720 of normal CP as shown in the example shown in FIG. 7B, the extended PRBs consist of 14 OFDM symbols of the subframes 1 or 6, and 3 OFDM symbol of DwPTS, a total of 17 OFDM symbols for scheduling PDSCH/ePDCCH.

Figure 7C:
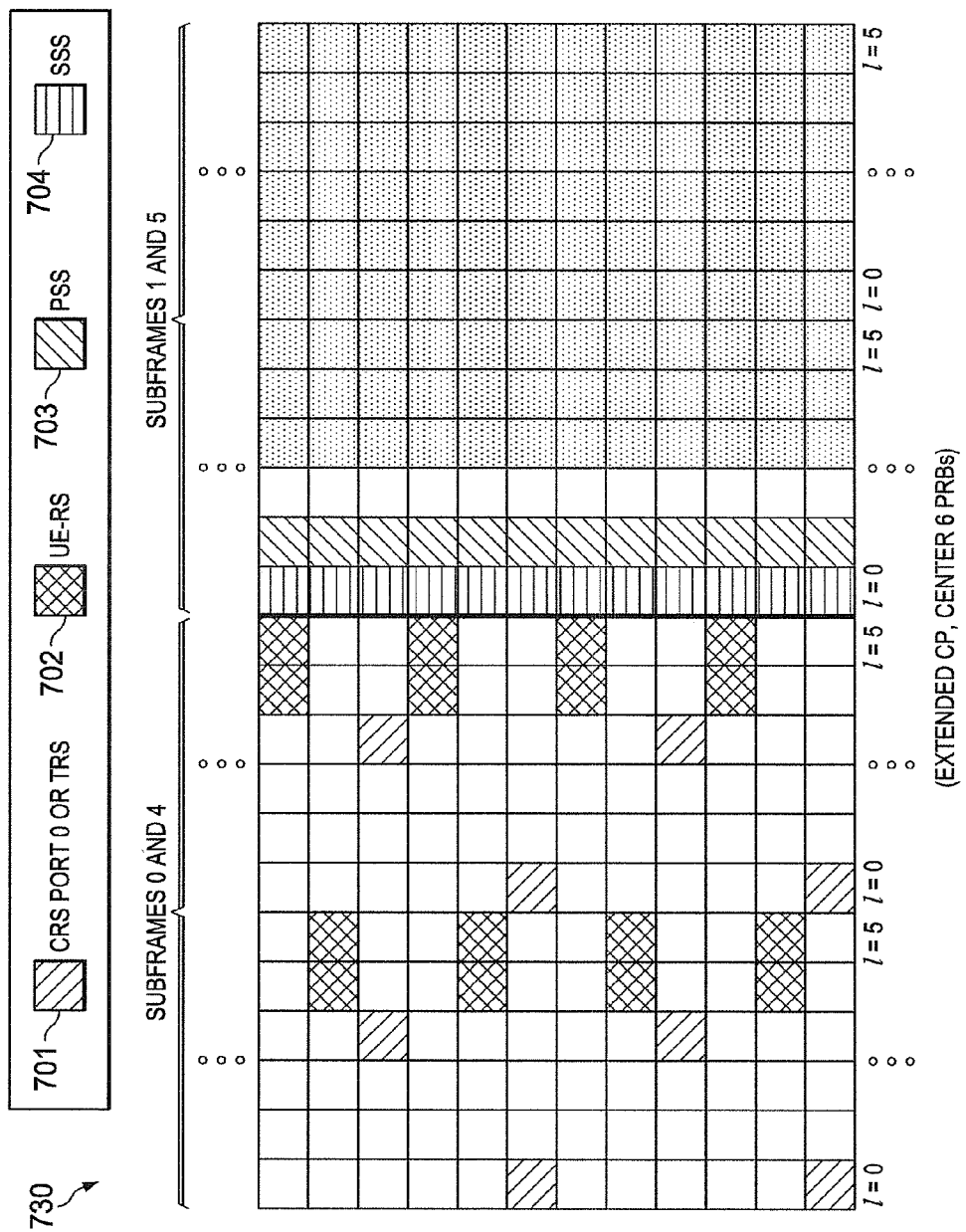
Figure 7D:
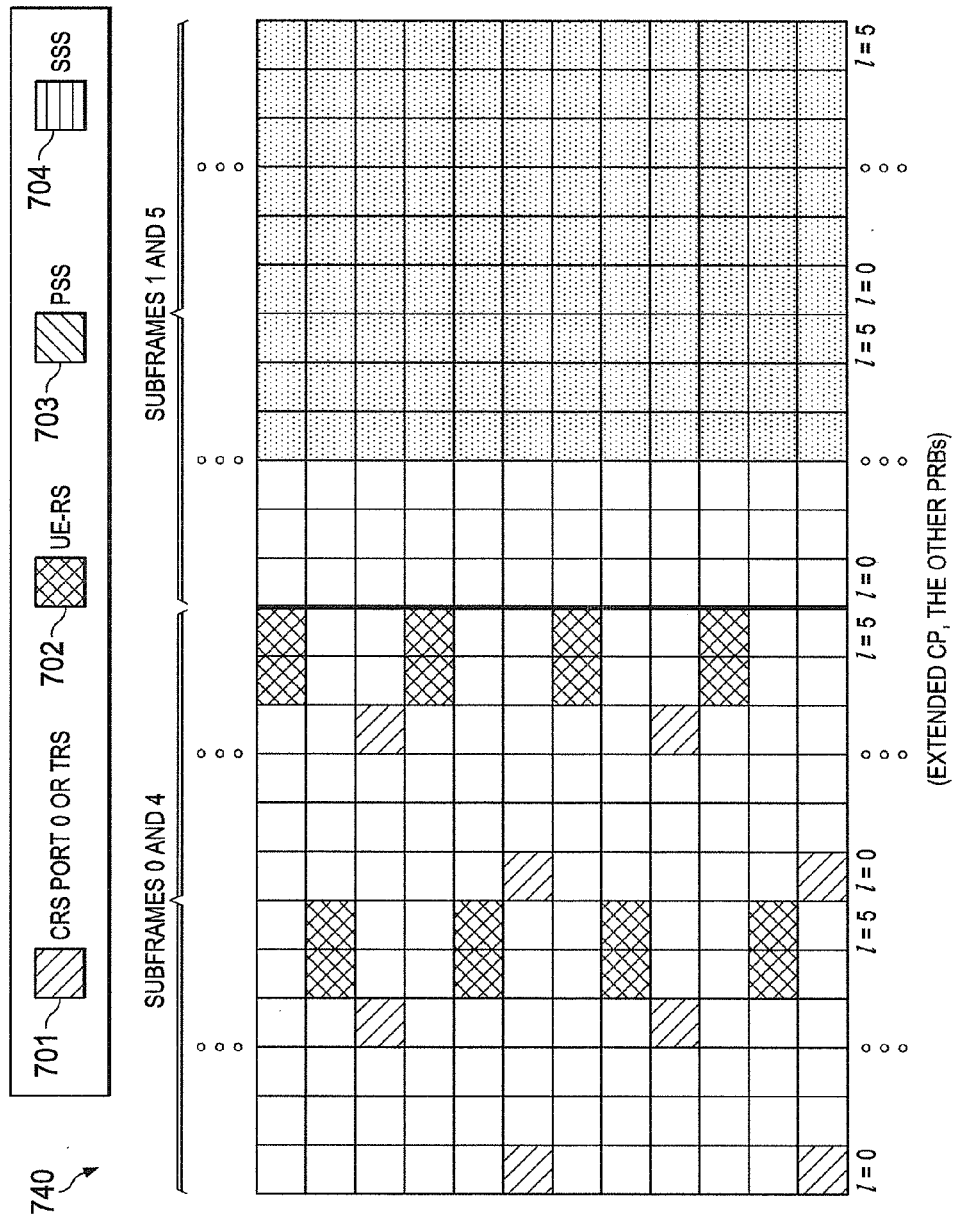

In the example shown in FIG. 7C, in the center 6 PRBs 730 of extended CP, the OFDM symbols 0 and 1 of the 3-OFDM-symbol DwPTS are used for PSS and SSS transmissions. Thus, the extended PRBs consist of 12 OFDM symbols of the subframes 1 or 6, and 1 OFDM symbol of DwPTS, a total of 13 OFDM symbols for scheduling transmissions, such as PDSCH/ePDCCH.

In the other PRBs 740 of normal CP as shown in the example shown in FIG. 7B, the extended PRBs consist of 12 OFDM symbols of the subframes 1 or 6, and 3 OFDM symbol of DwPTS, a total of 15 OFDM symbols for scheduling transmission, such as PDSCH/ePDCCH.

The transmissions, such as PDSCH and/or ePDCCH, scheduled in the extended PRBs consisting of the subframes 0 and 1 are demodulated utilizing the channel estimates by the UE-RS transmitted in subframe 0, if subframe 1 is a DwPTS with 3 OFDM symbols. Similarly, PDSCH/ePDCCH scheduled in the extended PRBs consisting of the subframes 5 and 6 are demodulated utilizing the channel estimates by the UE-RS transmitted in subframe 5, if subframe 6 is a DwPTS with 3 OFDM symbols.

It should be noted that the synchronization signal mappings of FIGS. 7A through 7D are for illustration only. In other embodiments, such as where only PSS are mapped in 3-OFDM-symbol DwPTS, the extended PRBs can be extended to include available REs for scheduling transmissions.

One approach for mapping modulation symbol sequences of a physical channel onto the REs in PRBs in presence of other physical channels is rate matching, where consecutive modulation symbols in the sequence are mapped to avoid the REs carrying other physical channels. For example, in each PRB, PDSCH modulation symbols in the sequence shall be mapped only in those REs not used for CSI-RS, UE-RS, PDCCH, and so on.

Another emerging approach is "puncturing", which is that the contiguous modulation symbols are mapped onto the REs in the PRB, e.g., in frequency-first or in time-first manner, and those symbols placed in the REs occupied by other physical channels are punctured out.

FIG. 8 illustrates a puncture mapping method according to embodiments of the present disclosure. The embodiment of the puncture mapping method 800 shown in FIG. 8 is for illustration only. Other embodiments could be used without departing from the scope of this disclosure.

In certain embodiments one example type of puncturing is the puncturing method that was proposed in R1-122000, "Mapping of ePDCCH to RE", submitted by Ericsson and ST-Ericsson at 3GPP TSG-RAN WG1 #69 on 21st-25 May 2012.

The design of the eREG in FIG. 8 gives approximately the same puncturing of all eREG for all extents of the legacy control region, the CRS for all possible number of APs, the presence of CSI-RS and frequency shifts. It is obtained by simply cycling through the 8 eREG and mapping frequency first, then over time over all 12 times 14 REs. To achieve a more evenly distributed puncturing of eREG, every column, or OFDM symbol is cyclically shifted by n steps for OFDM symbol N in the subframe.

While puncturing approach can simplify the base station's resource mapping operation, the number of punctured modulation symbols can be a variable across different PRBs or subframes, depending on the availability of other physical channels in each PRB or subframe. One consequence in case of ePDCCH mapping is that the number of REs in each eREG or eCCE can be a variable across different PRBs or subframes, and the variance can be large, if the number of eREGs/eCCEs per PRB is fixed to be the same. For example, the number of OFDM symbols available for eREG/eCCE mapping in the DwPTS subframes can be significantly lower than non-DwPTS subframes.

In certain embodiments, the number of eREGs/eCCEs per PRB is determined based on the number of available REs in the PRBs. It is noted that this process can be used with any of puncturing and rate-matching.

In one such embodiment, a UE determines the number of eREGs/eCCEs per PRB in DwPTS based on at least one of the special subframe configuration and whether the PRB contains synchronization signals i.e., PSS and/or SSS or not. For example, when a PSS is not mapped in case of a normal CP, 3-OFDM-DwPTS with a UE-RS pattern defined as in FIG. 7 have 36 REs for the downlink. In this case, two eREGs can be mapped in each PRB each can have up to 18 REs.

The number of REs per eREG described hereinafter is referred to as "nominal" number of REs, as puncturing reduces the actual number of REs carrying ePDCCH symbols for each eREG, depending on the availability of physical channels.

If a PSS is mapped, the 3-OFDM-DwPTS subframe with UE-RS pattern defined as in FIG. 5 or 6 has 24 REs for the downlink (excluding the PSS). In the case, one eREGs can be mapped in each PRB each can have up to 16 REs.

The tables are constructed such that each eREG is composed of at least $N_{REs}^{eREG}=15$ nominal REs. The number of available eREGs is calculated as $$N_{eREGs}^{RB} = \left\lfloor \frac{N_{REs}^{total}}{N_{REs}^{eREG}} \right\rfloor \quad (1)$$

and the number of nominal REs per eREG is calculated as $$\left\lfloor \frac{N_{REs}^{total}}{N_{eREGs}^{RB}} \right\rfloor \quad (2)$$

or $$\left\lfloor \frac{N_{REs}^{total}}{N_{eREGs}^{RB}} \right\rfloor + 1. \quad (3)$$

It is noted that the table can be easily modified if different number is assumed for $N_{REs}^{eREG}$.

Using Equations (1) through (3), TABLEs 4 to 9 are designed to determine the nominal number of REs per eREG below. TABLEs 4 through 6 apply for a normal CP, and TABLEs 7 through 9 apply for an extended CP. Also TABLEs 4 and 7 apply for PRBs without a PSS/SSS, TABLEs 5 and 8 apply for PRBs with PSS and without SSS, and TABLEs 6 and 9 apply for PRBs with a PSS and a SSS.

TABLE 4 applying for PRBs without a PSS/SSS in a normal-CP subframe is as follow:

TABLE 4

| | Special subframe configuration | | | | | | | | |
|---|---|---|---|---|---|---|---|---|---|
| | 0 | 1 | 2 | 3 | 4 | 5 | 6 | 7 | 8 |
| Num. of OFDM symbols | 3 | 9 | 10 | 11 | 12 | 3 | 9 | 10 | 11 |
| Num. of available REs ($N_{REs}^{total}$) | 36 | 108 | 120 | 132 | 144 | 36 | 108 | 120 | 132 |
| Num. of available eREGs | 2 | 7 | 8 | 8 | 9 | 2 | 7 | 8 | 8 |
| Nominal Num. of REs per eREG | 18 | 15 or 16 | 15 | 16 or 17 | 16 | 18 | 15 or 16 | 15 | 16 or 17 |

TABLE 5 applying for PRBs with a PSS in a normal-CP subframe is as follow:

TABLE 5

| | Special subframe configuration | | | | | | | | |
|---|---|---|---|---|---|---|---|---|---|
| | 0 | 1 | 2 | 3 | 4 | 5 | 6 | 7 | 8 |
| Num. of OFDM symbols | 3 | 9 | 10 | 11 | 12 | 3 | 9 | 10 | 11 |
| Num. of available RES ($N_{REs}^{total}$) | 24 | 96 | 108 | 120 | 132 | 24 | 96 | 108 | 120 |
| Num. of available eREGs | 1 | 6 | 7 | 8 | 8 | 1 | 6 | 7 | 8 |
| Nominal Num. of REs per eREG | 24 | 16 | 15 or 16 | 15 | 16 or 17 | 24 | 16 | 15 or 16 | 15 |

TABLE 6 applying for a PRB with a PSS and a SSS in normal-CP subframe is as follow:

TABLE 6

| | Special subframe configuration | | | | | | | | |
|---|---|---|---|---|---|---|---|---|---|
| | 0 | 1 | 2 | 3 | 4 | 5 | 6 | 7 | 8 |
| Num. of OFDM symbols | 3 | 9 | 10 | 11 | 12 | 3 | 9 | 10 | 11 |
| Num. of available REs ($N_{REs}^{total}$) | 12 | 84 | 96 | 108 | 120 | 12 | 84 | 96 | 108 |
| Num. of available eREGs | 0 | 5 | 6 | 7 | 8 | 0 | 5 | 6 | 7 |
| Nominal Num. of REs per eREG | 0 | 16 or 17 | 16 | 15 or 16 | 15 | 0 | 16 or 17 | 16 | 15 or 16 |

TABLE 7 applying for PRBs without PSS/SSS in an extended-CP subframe is as follow:

TABLE 7

| | Special subframe configuration | | | | | | |
|---|---|---|---|---|---|---|---|
| | 0 | 1 | 2 | 3 | 4 | 5 | 6 |
| Num. of OFDM symbols | 3 | 8 | 9 | 10 | 3 | 8 | 9 |
| Num. of available REs ($N_{RE_s}^{total}$) | 36 | 96 | 108 | 120 | 36 | 96 | 108 |
| Num. of available eREGs | 2 | 6 | 7 | 8 | 2 | 6 | 7 |
| Nominal Num. of REs per eREG | 18 | 16 | 15 or 16 | 15 | 18 | 16 | 15 or 16 |

TABLE 8 applying for PRBs with a PSS in an extended-CP subframe is as follow:

TABLE 8

| | Special subframe configuration | | | | | | |
|---|---|---|---|---|---|---|---|
| | 0 | 1 | 2 | 3 | 4 | 5 | 6 |
| Num. of OFDM symbols | | 8 | 9 | 10 | 3 | 8 | 9 |
| Num. of available REs ($N_{RE_s}^{total}$) | 24 | 84 | 96 | 108 | 24 | 84 | 96 |
| Num. of available eREGs | 1 | 5 | 6 | 7 | 1 | 5 | 6 |
| Nominal Num. of REs per eREG | 24 | 16 or 17 | 16 | 15 or 16 | 24 | 16 or 17 | 16 |

TABLE 9 applying for PRB with a PSS and a SSS in an extended-CP subframe is as follow:

TABLE 9

| | Special subframe configuration | | | | | | |
|---|---|---|---|---|---|---|---|
| | 0 | 1 | 2 | 3 | 4 | 5 | 6 |
| Num. of OFDM symbols | 3 | 8 | 9 | 10 | 3 | 8 | 9 |
| Num. of available REs ($N_{RE_s}^{total}$) | 12 | 72 | 84 | 96 | 12 | 72 | 84 |
| Num. of available eREGs | 0 | 4 | 5 | 6 | 0 | 4 | 5 |
| Nominal Num. of REs per eREG | 0 | 18 | 16 or 17 | 16 | 0 | 18 | 16 or 17 |

In certain embodiments, the number of eREGs/eCCEs per PRB is determined according to the number of available REs in the PRBs, further explicitly considering the PDCCH region size. If a PDCCH is a significant fraction of the DwPTS, then puncturing or rate matching will be done explicitly accounting for the PDCCH region. The number of eREGs supported for ePDCCH is dependent on the size of PDCCH. For example, for the DwPTS with special subframe configuration 0, no ePDDCH is supported if a PDCCH occupies 3 OFDM symbols.

In certain embodiments, the number of REGs are determined based on $$n\_DwPTS - n\_PDCCH \qquad (4)$$

where n_DwPTS is the length of DwPTS in OFDM symbols for the corresponding configuration, and n_PDCCH is the length of PDCCH in OFDM symbols. It is noted that the number n_PDCCH can be fixed, or configured by a higher-layer such as RRC, or derived from the PCFICH detected.

Figure 9:
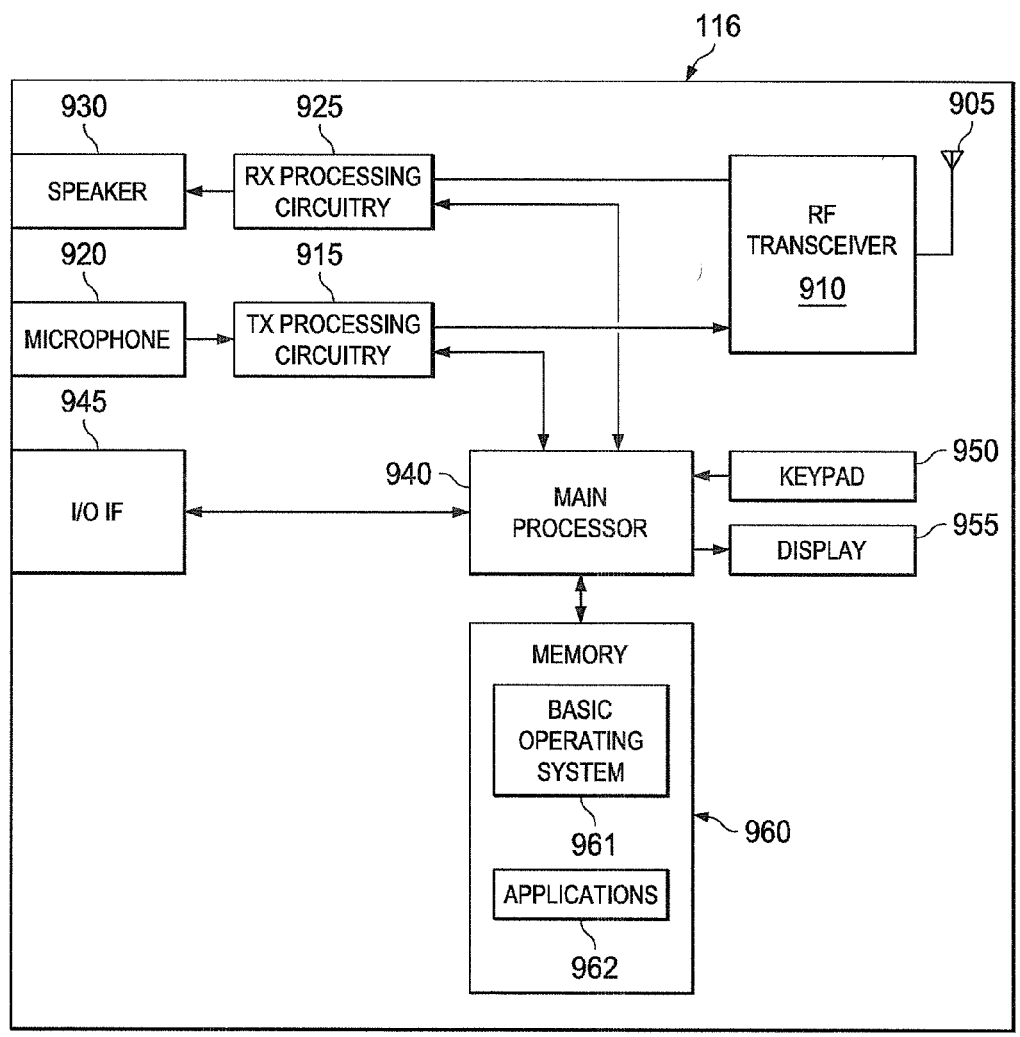
FIG. 9 illustrates a subscriber station according to an exemplary embodiment of the disclosure.

FIG. 9 illustrates a subscriber station according to embodiments of the present disclosure. The embodiment of subscribe station, such as UE 116, illustrated in FIG. 9 is for illustration only. Other embodiments of the wireless subscriber station could be used without departing from the scope of this disclosure.

UE 116 comprises antenna 905, radio frequency (RF) transceiver 910, transmit (TX) processing circuitry 915, microphone 920, and receive (RX) processing circuitry 925. Although shown as a single antenna, antenna 905 can include multiple antennas. SS 116 also comprises speaker 930, main processor 940, input/output (I/O) interface (IF) 945, keypad 950, display 955, and memory 960. Memory 960 further comprises basic operating system (OS) program 961 and a plurality of applications 962.

Radio frequency (RF) transceiver 910 receives from antenna 905 an incoming RF signal transmitted by a base station of wireless network 100. Radio frequency (RF) transceiver 910 down-converts the incoming RF signal to produce an intermediate frequency (IF) or a baseband signal. The IF or baseband signal is sent to receiver (RX) processing circuitry 925 that produces a processed baseband signal by filtering, decoding, and/or digitizing the baseband or IF signal. Receiver (RX) processing circuitry 925 transmits the processed baseband signal to speaker 930 (i.e., voice data) or to main processor 940 for further processing (e.g., web browsing).

Transmitter (TX) processing circuitry 915 receives analog or digital voice data from microphone 920 or other outgoing baseband data (e.g., web data, e-mail, interactive video game data) from main processor 940. Transmitter (TX) processing circuitry 915 encodes, multiplexes, and/or digitizes the outgoing baseband data to produce a processed baseband or IF signal. Radio frequency (RF) transceiver 910 receives the outgoing processed baseband or IF signal from transmitter (TX) processing circuitry 915. Radio frequency (RF) transceiver 910 up-converts the baseband or IF signal to a radio frequency (RF) signal that is transmitted via antenna 905.

In certain embodiments, main processor 940 is a microprocessor or microcontroller. Memory 960 is coupled to main processor 940. According to some embodiments of the present disclosure, part of memory 960 comprises a random access memory (RAM) and another part of memory 960 comprises a Flash memory, which acts as a read-only memory (ROM).

Main processor 940 executes basic operating system (OS) program 961 stored in memory 960 in order to control the overall operation of wireless subscriber station 116. In one such operation, main processor 940 controls the reception of forward channel signals and the transmission of reverse channel signals by radio frequency (RF) transceiver 910, receiver (RX) processing circuitry 925, and transmitter (TX) processing circuitry 915, in accordance with well-known principles.

Main processor 940 is capable of executing other processes and programs resident in memory 960, such as operations for reception of physical channels in DwPTS as described in embodiments of the present disclosure. Main processor 940 can move data into or out of memory 960, as required by an executing process. In some embodiments, the main processor 940 is configured to execute a plurality of applications 962, such as applications for CoMP communications and MU-MIMO communications. The main processor 940 can operate the plurality of applications 962 based on OS program 961 or in response to a signal received from BS 102. Main processor 940 is also coupled to I/O interface 945. I/O interface 945 provides subscriber station 116 with the ability to connect to other devices such as laptop computers and handheld computers. I/O interface 945 is the communication path between these accessories and main controller 940.

Main processor 940 is also coupled to keypad 950 and display unit 955. The operator of subscriber station 116 uses keypad 950 to enter data into subscriber station 116. Display 955 may be a liquid crystal display capable of rendering text and/or at least limited graphics from web sites. Alternate embodiments may use other types of displays.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a wireless network, a method for scheduling a Downlink Pilot Time Slot (DwPTS) subframe, the method comprising:
   expanding Physical Resource Blocks (PRBs) in a subframe prior to a DwPTS subframe to include resource elements (REs) of the DwPTS subframe, a number of OFDM symbols of the DwPTS subframe being less than or equal to a threshold OFDM symbol number; and
   facilitating for a UE to demodulate REs in a DwPTS subframe based on DeModulation Reference Signals (DMRS) transmitted in a downlink subframe prior to the DwPTS subframe.

2. The method of claim 1, wherein the threshold OFDM symbol number is three.

3. The method of claim 1, wherein the REs in the DwPTS subframe and the REs in the prior downlink subframe are precoded by a same precoding scheme.

4. The method of claim 1, wherein the prior downlink subframe is either subframe 0 or subframe 5, and the DwPTS subframe is either subframe 1 or subframe 6, respectively.

5. The method of claim 2, wherein the DwPTS subframe has one of special subframe configurations 0 and 5 with normal CP, or one of special subframe configurations 0 and 4 with extended CP.

6. For use in a wireless network, a method for demodulating a Downlink Pilot Time Slot (DwPTS) subframe, the method comprising:
   receiving transmissions in expanded Physical Resource Blocks (PRBs), each expanded PRB including a DwPTS subframe with a number of OFDM symbols being less than or equal to a threshold OFDM symbol number, and a subframe prior to the DwPTS subframe; and
   demodulating Resource Elements (REs) in the DwPTS subframe by utilizing the channel estimates from DeModulation Reference Signals (DMRS) transmitted in the prior subframe.

7. The method of claim 6, wherein the threshold OFDM symbol number is three.

8. The method of claim 6, wherein the REs in the DwPTS subframe and the REs in the prior downlink subframe are precoded by a same precoding scheme.

9. The method of claim 6, wherein the prior downlink subframe is either subframe 0 or subframe 5, and the DwPTS subframe is either subframe 1 or subframe 6, respectively.

10. The method of claim 1, wherein the DwPTS subframe has one of special subframe configurations 0 and 5 with normal CP, or one of special subframe configurations 0 and 4 with extended CP.

11. A base station configured to communicate with a User Equipment (UE), the base station comprising:
    processing circuitry coupled to a memory, the memory including a plurality of instructions that, when executed are configured to cause the processing circuitry to:
      expand Physical Resource Blocks (PRBs) in a subframe prior to a DwPTS subframe to include resource elements (REs) of the DwPTS subframe, a number of OFDM symbols of the DwPTS subframe being less than or equal to a threshold OFDM symbol number, and
      facilitate for a UE to demodulate REs in a DwPTS subframe based on DeModulation Reference Signals (DMRS) transmitted in a downlink subframe prior to the DwPTS subframe.

12. The base station of claim 11, wherein the threshold OFDM symbol number is three.

13. The base station of claim 11, wherein the REs in the DwPTS subframe and the REs in the prior downlink subframe are precoded by a same precoding scheme.

14. The base station of claim 11, wherein the prior downlink subframe is either subframe 0 or subframe 5, and a DwPTS subframe is either subframe 1 or subframe 6, respectively.

15. The base station of claim 11, wherein the DwPTS subframe has one of special subframe configurations 0 and 5 with normal CP, or one of special subframe configurations 0 and 4 with extended CP.

16. A user equipment configured to communicate with a base station, the user equipment comprising:
    processing circuitry coupled to a memory, the memory including a plurality of instructions that, when executed are configured to cause the processing circuitry to:
      receive transmissions in expanded Physical Resource Blocks (PRBs), each expanded PRB including a DwPTS subframe with a number of OFDM symbols being less than or equal to a threshold OFDM symbol number, and a subframe prior to the DwPTS subframe, and
      demodulate Resource Elements (REs) in the DwPTS subframe by utilizing the channel estimates from DeModulation Reference Signals (DMRS) transmitted in the prior subframe.

17. The user equipment of claim 16, wherein the threshold OFDM symbol number is three.

18. The user equipment of claim 16, wherein the REs in the DwPTS subframe and the REs in the prior downlink subframe are precoded by a same precoding scheme.

19. The user equipment of claim 16, wherein the prior downlink subframe is either subframe 0 or subframe 5, and a DwPTS subframe is either subframe 1 or subframe 6, respectively.

20. The user equipment of claim 16, wherein the DwPTS subframe has one of special subframe configurations 0 and 5 with normal CP, or one of special subframe configurations 0 and 4 with extended CP.

* * * * *